Reissued June 30, 1953

Re. 23,677

UNITED STATES PATENT OFFICE 23,677

METHOD OF PROCESSING LUBRICATING OIL BY TREATING WITH SULFURIC ACID, A PHOSPHORUS SULFIDE AND A BASE AND THE RESULTING PRODUCTS

John D. Bartleson, Beachwood Village, Ohio, assignor to The Standard Oil Company, Cleveland, Ohio, a corporation of Ohio No Drawing. Original No. 2,560,547, dated July 17, 1951, Serial No. 30,207, May 29, 1948. Application for reissue June 10, 1952, Serial No. 292,779

22 Claims. (Cl. 252—32.7)

Matter enclosed in heavy brackets [ ] appears in the original patent but forms no part of this reissue specification; matter printed in italics indicates the additions made by reissue.

This invention relates to processes of improving hydrocarbon base lubricants, and more particularly to the treatment of hydrocarbon lubricants with sulfuric acid, then with a small amount of a phosphorus sulfide, and following this by the treatment thereof with a base, and including a clay treatment, to form lubricants having improved properties, especially as to corrosion, lacquer, sludge, viscosity increase, and the like characteristics. It also relates to the resulting improved lubricants, especially those having an ash content.

Many of the commercially used lubricants are based upon hydrocarbon stock, which may be synthetically prepared or which may be derived from natural sources, such as petroleum. For many purposes so-called "additives" must be included with the hydrocarbon in order to provide a lubricant having suitable characteristics. This is especially so in the case of acid refined oils with detergent properties. Generally the inclusion of these additives is associated with a higher cost of the finished lubricant. The preparation of a finished lubricant directly from hydrocarbon stock by a chemical finishing or refining process (which does not involve solvent-refining or a detergent additive) at a commercially interesting cost has been a particularly baffling problem to the art.

In accordance with the invention, it has been found that hydrocarbon lubricating oil stock may be refined by treatment with sulfuric acid in the conventional manner, and then further refined by treatment with a small amount of a phosphorus sulfide, and following this with a metal or nitrogen base treatment; and the resulting refined product is an improved lubricant; i. e., a chemical finished or refined lubricant. A separate clay treatment step is included in the process at a stage after the sulfuric acid refining step, preferably before the phosphorus sulfide refining step or after the metal or nitrogen base treatment step or both. Such lubricants are suitable for use under various conditions, including high temperatures or high pressures or both; as, for instance, use in an internal combustion engine operating at high temperatures and in which the lubricant is in close contact with metallic surfaces, metal compounds and high temperature gases. They are also suitable for use in extreme pressure lubricants, e. g., in oils and greases containing the same.

The treatment of the hydrocarbon oil with sulfuric acid may be carried out in the conventional manner, e. g., using from 1 to 100 lbs. of acid per barrel of oil, at a treating temperature in the range of 32° to 300° F. A sludge or acid layer is removed. This step has been long and well-known in the art.

The further refining of the resulting hydrocarbon oil with the phosphorus sulfide may be conducted with direct admixture, or, if desired, by their admixture in the presence of a diluent which may be subsequently removed. Generally a diluent is not necessary. The reaction or treatment is usually complete in about 10 hours or less time, generally 1 to 2 hours. The treating time is a function of the temperature, the amount of sulfide that is to react, the subdivision of the reactants, the efficiency of mixing the reactants, and the like.

The hydrocarbon lubricant stock is reacted with the phosphorus sulfide in a ratio of from about 0.1 to about 0.75% by weight, based on the weight of the hydrocarbon stock, desirably about 0.25 to about 0.6%, and preferably about 0.4 to 0.5%. If a higher amount of the sulfide is used, such as 1%, some of the characteristics of the resulting product are worse than the initial hydrocarbon oil, especially the viscosity increase. At least 0.1% of the sulfide should be used to achieve the results desired in a commercial oil, although small amounts show improvement.

The treatment of the hydrocarbon with the phosphorus sulfide may be carried out in the presence or absence of air, or in an atmosphere of inert or non-deleterious gas, such as nitrogen or $H_2S$. It may also be carried out under pressure, e. g., pressure of the inert gas or that generated when the reaction is carried out in a closed vessel.

The sulfide treating temperature varies with the hydrocarbon stock. Generally the temperature should be at least 275° F., but should be below the temperature at which the reaction product would be decomposed. A temperature in the range of about 300° to about 450° F. is preferred in many cases. The treated oil, before or after conversion to a base derivative or both, may be centrifuged or filtered to remove any by-products, sludge, or other by-product material. If a volatile diluent is used, it may be removed by evaporation.

The acid and sulfide refined oil is next treated with a base derivative, such as a metal compound.

The metal base may be one or more metal compounds, such as their sulfides, oxides, hydroxides, carbides and cyanamides. The preferred metals are group I, group II and group III metals of the periodic table, such as potassium, zinc, barium and aluminum. For particular services, the heavier metals have particular use, i. e. those below zinc in the electromotive series, such as chromium, cadmium, tin, lead, antimony, bismuth, arsenic, and the like. The alkali and alkali earth metals are preferred and of these potassium has been selected for the examples in order that they may all be comparative.

In the preparation of the above type base derivatives, the treatment with the base may be carried out at temperature in the range of about 100° to about 350° F., a temperature in the range of about 180° F. to 250° F. being preferred.

From about 0.25 to about 6.0 equivalents of the metal compound may be used per mol of the sulfide used in the sulfide treatment, preferably about 1.0 to about 3.0 equivalents. An equivalent is the quotient of a mol divided by the valence of the metal concerned.

The hydrocarbon lubricant stock to which the process is applied may be a raw oil, e. g., a fluid hydrocarbon having a viscosity at 100° F. of 10 to 500 centistokes such as that used in S. A. E. 10 to 50 oils. It may be obtained as a distillate or from synthetic material, such as petroleum, and oils produced by cracking, polymerization, hydrogenation, and the like methods.

In order to illustrate and point out some of the advantages of the invention, but in no sense as a limitation thereof, the following specific embodiments are included.

In these examples the hydrocarbon stock is a conventional Mid-Continent lubricating oil base stock, of 20–30 S. A. E. viscosity (#300 Red Oil). It is treated with sulfuric acid (10–15 lbs. of 93% acid per barrel of oil) in a conventional manner, and the sludge or acid layer is separated. The phosphorus sulfide is mixed with the acid refined hydrocarbon lubricating oil, in the amounts indicated in the following table, and agitated for 1 hour at 300° F. at atmospheric pressure. Then it is mixed with the amount and kind of base (based on the weight of the hydrocarbon stock) indicated in the following table, and agitated for 2 hours at 250° F., at atmospheric pressure. A good yield is obtained, based on the hydrocarbon lubricating oil, and no sludge is formed. However, it is preferred to filter the final reaction product.

In Examples 1, 2 and 3, the hydrocarbon oil used was obtained from #300 Red Oil, by treating with 10–15 lbs. of 93% sulfuric acid, and allowed to settle overnight; portions of the hydrocarbon layer thereof were used in these examples. In Examples 4, 5 and 6, the Red Oil was similarly acid treated and settled, and then the hydrocarbon layer was separated and treated with 8 lbs. of clay per barrel of oil; portions of this oil were taken prior to filtration and used in these examples. The oil used in Examples 7, 8, 9, 10, 11 and 12 was similarly treated, but the portions were taken after filtration. In Examples 13, 14 and 15, #225 Red Oil was used (a similar oil to the above, but of 20 S. A. E. viscosity), which was similarly acid treated, then clay treated and filtered. The oil was treated with the kind and amounts of phosphorus sulfide, and then base, as indicated in the following table. The preceding, or subsequent, or both separate clay treatments are also indicated. The reaction product is identified hereinafter by the example number.

| Example Number | Clay in pounds per barrel oil | Kind and Amount of Phosphorus Sulfide in Per Cent by Weight of Hydrocarbon | Kind and Amount of Base | Clay in pounds per barrel oil |
|---|---|---|---|---|
| 1 | | 0.6% $P_2S_5$ | 0.6% KOH | 8 |
| 2 | | 0.4% $P_2S_5$ | 0.4% KOH | 8 |
| 3 | | do | 0.6% KOH | 4 |
| 4 | 8 | 0.6% $P_2S_5$ | 0.6% KOH | |
| 5 | 8 | do | 0.6% KOH | 2 |
| 6 | 8 | 0.8% $P_2S_5$ | 0.8% KOH | 2 |
| 7 | 8 | 0.4% $P_2S_5$ | 0.4% KOH | |
| 8 | 8 | 0.6% $P_2S_5$ | 0.6% KOH | |
| 9 | 8 | do | 0.6% KOH | 2 |
| 10 | 8 | 0.8% $P_2S_5$ | 0.8% KOH | |
| 11 | 8 | 0.4% $P_2S_5$ | 0.6% KOH | |
| 12 | 8 | do | 0.8% KOH | |
| 13 | 8 | 0.4% $P_4S_3$ | 0.05% KOH | |
| 14 | 8 | do | 0.10% KOH | |
| 15 | 8 | 0.2% $P_2S_5$ and 0.2% $P_4S_3$. | 0.3% KOH | |

*The amount of potassium hydroxide in Example 12 is 8.0 equivalents per mol of the phosphorus pentasulfide.*

The "Sohio" corrosion test was used in evaluating lubricants made in accordance with the invention. This test is described in a co-pending application of E. C. Hughes, J. D. Bartleson, M. L. Sunday and M. M. Fink, which also correlates the results of the laboratory tests with a Chevrolet engine test.

Essentially the laboratory test equipment consists of a vertical thermostatically heated glass test tube (45 mm. outside diameter and 42 cm. long), into which is placed the corrosion test unit. An air inlet is provided for admitting air into the lower end of the corrosion unit in such a way that in rising the air will cause the oil and suspended material therein to circulate into the corrosion unit. The tube is filled with an amount of oil to be tested which is at least sufficient to submerge the metals being tested.

The corrosion test unit essentially consists in a circular relatively fine grained copper-lead test piece of $\frac{13}{16}$'' O. D., which has a $\frac{1}{4}$'' diameter hole in its center (i. e., shaped like an ordinary washer). The test piece has an exposed copper-lead surface of 3.00 sq. cm. Of this surface area, 1.85 sq. cm. acts as a loaded bearing, and is contacted by a part of the cylindrical surface of a hardened steel drill rod (14'' diameter and $\frac{21}{32}$'' long, and of 51–57 Rockwell hardness).

The drill rod is held in a special holder, and the holder is rotated so that the surface of the drill rod which contacts the bearing sweeps the bearing surface (the drill rod is not rotated on its own axis and the surface of the drill rod which contacts the bearing is not changed).

The corrosion test unit means for holding the bearing and the drill rod is a steel tubing (15'' long and $1\frac{1}{32}$'' O. D.) which is attached to a support. A steel cup 1'' long, $1\frac{1}{32}$'' O. D. by $\frac{13}{16}$'' I. D.) is threaded into the steel tube, at the lower end. The cup has a $\frac{3}{8}$'' diameter hole in the bottom for admitting the oil into the corrosion chamber. The copper-lead test piece fits snugly into the steel cup and the hole in the test piece fits over the hole in the steel cup. A section of steel rod ($\frac{3}{8}$'' in diameter and 19'' long) serves as a shaft and is positioned by 2 bearings which are fixedly set in the outer steel tubing, one near the top and one near the lower (threaded) end thereof. Several holes are drilled just above and just below the lower bearing. The holes above the bearing facilitate cleaning the apparatus, while the holes below the bearing enable the circulation of oil through the corrosion chamber. The drill rod holder is connected to the shaft by a self-aligning yoke and pin coupling. This assures instantaneous and continuous alignment of the drill rod bearing member against the bearing surface at all times. A pulley is fitted to the top of the steel shaft and the shaft is connected therethrough to a power source. The shaft is rotated at about 675 R. P. M.; and the weight of the shaft and attached members is about 600 grams, which is the gravitational force which represents the thrust on the bearing. The air lift from the air inlet pumps the oil through the chamber containing the test piece and out through the holes in the steel tubing.

The ratios of surface active metals to the volume of oil in an internal combustion test engine are nearly quantitatively duplicated in the test equipment. The temperature used is approximately that of the bearing surface. The rate of air flow per volume of oil is adjusted to the same as the average for a test engine in operation. Of the catalytic effects, those due to soluble iron are the most important. They are empirically duplicated by the addition of a soluble iron salt. Those due to lead-bromide are duplicated by its addition.

The test was correlated with the L-4 Chevrolet test, and a slightly modified version thereof. The modified test comprised reducing the oil additions from the 4 quarts in the usual procedure to 2 quarts, by reducing the usual 1 pint oil additions which are made at 4 hour intervals to ½ pint additions. This modification increases the severity of the test in its corrosion and detergency components, particularly in the case of border line oils.

For each test, the glass parts are cleaned by the usual chromic acid method, rinsed and dried. The metal parts are washed with chloroform and carbon disulfide and polished with No. 925 emery cloth or steel wool. A new copper-lead test piece is used for every test. The test piece is polished before use, on a surface grinder to give it a smooth finish. The test piece is weighed before and after the test on an analytical balance to evaluate the corrosion. After placing the oil and corrosion test unit in the tube, and bringing the assembly up to temperature in the thermostat, soluble catalyst is added and the air flow is started. Lead-bromide catalyst is added immediately after starting the air, and timing of the test is begun.

The laboratory test conditions which were found to correlate with the Chevrolet procedure 36-hour test are shown in the following table.

Table A

Temperature—325° F.
Oil sample—107 cc.
Air flow rate—70 liters/hour
Time—10 hours
Catalysts—Steel; copper-lead bearing: 3 sq. cm. area of which 1.85 sq. cm. is a bearing surface; ferric 2-ethyl hexoate: 0.05% as $Fe_2O_3$ in C. P. benzene; lead bromide: 0.1% as precipitated powder.
Bearing assembly:
Load ----------grams-- 600
Speed ----------R. P. M.-- 675

By extending the laboratory test to 20 hours, it was found that correlation with the Chevrolet 72-hour test could be obtained.

At the close of the test period, the extent of corrosion is determined by reweighing the corrosion test piece and determining the change in weight due to the test. An accurate evaluation of the lacquering properties of an oil is obtained by a visual rating system which is applied to the outer surface of the corrosion unit steel tube and metal cup in much the same way that the piston skirt, cylinder wall, etc. of an engine are rated for varnishes. The sludge rating of the engine is simulated by a visual rating of the insoluble materials and used oil which are coated on the glass test tube at the conclusion of the test. For both sludge and varnish rating a scale rating of A (best) to F (worst) is used.

A sufficient volume of used oil is obtained from the test for determination of the usual used oil properties, such as pentane insolubles (sludge), viscosity increase, neutralization number and optical density.

The term "optical density," as used in the present disclosure, represents the standard logarithmic ratio of intensity of an incident ray falling on a transparent or translucent medium to the intensity of the transmitted ray for a sample length of one meter and light of wave length from 5100 to 5500 Angstroms.

The data in the following tables typify the results obtained in 20-hour "Sohio" corrosion tests on hydrocarbon lubricating oil base stock, and the improved lubricants prepared therefrom in accordance with the invention.

Table I

| Lubricant—Example No. | S. A. E. 20-30 (Blank) | 1 | 2 | 3 | 4 | 5 |
|---|---|---|---|---|---|---|
| Corrosion of Cu-Pb (in mgms. weight loss of) | 28.1 | 3.0 | 3.8 | 5.2 | 7.5 | 4.9 |
| Viscosity Increase (S US) | 938 | 217 | 93 | 85 | 72 | 90 |
| Pentane Insolubles (in mgm./10 g. of lubricant) | 895 | 200 | 222 | 213 | 212 | 217 |
| Acid Number | 5.39 | 1.4 | 1.0 | 1.9 | 1.7 | 1.8 |
| Sludge Rating | D− | B | B | B | B+ | A− |
| Lacquer Rating | E | C | C | C+ | C− | C |
| Optical Density | 260 | 86.7 | 66.4 | 77.9 | 86 | 71 |
| Ash Content (per cent by weight, as sulfate) | 0.0 | 0.15 | 0.274 | 0.690 | 0.33 | 0.45 |

Table II

| Lubricant—Example No. | S. A. E. 20-30 (Blank) | 6 | 7 | 8 | 9 | 10 |
|---|---|---|---|---|---|---|
| Corrosion of Cu-Pb (in mgms. weight loss of) | 28.1 | 6.6 | 6.1 | 7.6 | 7.9 | 9.2 |
| Viscosity Increase (S US) | 938 | 17 | 64 | 130 | 141 | 134 |
| Pentane Insolubles (in mgm./10 g. of lubricant) | 895 | 155 | 152 | 177 | 173 | 209 |
| Acid Number | 5.39 | 0.94 | 1.2 | 1.3 | 0.94 | 1.3 |
| Sludge Rating | D− | A+ | A− | A | A | A+ |
| Lacquer Rating | E | C− | D | C− | D | D |
| Optical Density | 260 | 103 | 106 | 146 | 134 | 154 |
| Ash Content (per cent by weight, as sulfate) | 0.0 | 0.53 | 0.30 | 0.60 | 0.57 | 0.63 |

Table III

| Lubricant—Example No. | S. A. E. 20 (Blank) | 13 | 14 | 15 |
|---|---|---|---|---|
| Corrosion of Cu-Pb (in mgms. weight loss of) | 151.8 | 7.1 | 6.5 | 4.2 |
| Viscosity Increase (SUS) | 1,390 | 100 | 124 | 62 |
| Pentane Insolubles (in mgm./10 g. of lubricant) | 1,395 | 99 | 118 | 68 |
| Acid Number | 5.2 | 0.74 | 1.04 | 0.80 |
| Sludge Rating | E | A− | A− | A |
| Lacquer Rating | D | A | A | A |
| Ash Content (percent by weight, as sulfate) | 0.0 | .062 | .018 | .258 |

The above data show that the reaction products of the invention are clearly superior lubricants to the blank oil, and the great improvement in corrosion, viscosity increase, and pentane insolubles is especially noteworthy. Example 1 (one clay treatment as last step) shows especially low corrosion; Example 6 (two clay treatments) shows especially low viscosity increase; and Example 15 (one clay treatment before the phosphorus sulfide refining step) shows especially low pentane insolubles.

A similar example in which the oil is treated simultaneously with sulfide, KOH and clay shows the unsuitability of this method because of high viscosity increase. A subsequent and separate clay treatment raises the viscosity increase. Simultaneous clay and sulfide treatment followed by KOH treatment is not satisfactory. These examples demonstrate the necessity of the steps recited in the order specified.

The 36-hour L-4 Chevrolet engine test was also used in comparing the oils of Examples 5, 6, 8, 11 and 12. In this test, new piston rings and two new copper-lead bearing inserts are installed in the motor prior to each test. The engine is a conventional Chevrolet engine with 216.5 cu. in. piston displacement and a compression ratio of 6.5 to 1. The engine is operated at 3150 R. P. M. with a load of 30 B. H. P. and at a temperature at the jacket outlet of 200° F. The lubricating oil temperature is maintained at 265° F. for an S. A. E. 10 grade oil, and at 280° F. for oils of S. A. E. 30 to 50 grades. The fuel used contains from 2.5 to 3.0 ml. of tetraethyl lead per gallon. Besides the weight loss of the test bearings, deposits in the power section, and properties of the used oil, sampled near the middle and also at the end of the test, are examined. The following results were obtained.

Table IV

| Lubricant—Example No. | 5 | 6 | 8 | 11 | 12 |
|---|---|---|---|---|---|
| Overall Rating | 68.75 | 80.50 | 86.25 | 84.25 | 93.50 |
| Bearing Corrosion (mgms./bearing half-shell) | 74 | 70 | 176 | 232 | 83.5 |
| Viscosity Increase (SUS) | −24 | 38 | −72 | −80 | 63 |
| Pentane Insolubles (in per cent by weight of the oil) | 3.84 | 2.04 | 1.89 | 2.73 | 2.66 |
| Acid Number | 2.2 | 0.97 | 1.55 | 1.45 | 0.89 |

These Table IV data also show that the products of the invention are particularly desirable lubricants. The reaction product of Example 6 (wherein 0.6% $P_2S_5$ and 0.6% KOH are used) is to be preferred to the Example 5 reaction product (from 0.4% $P_2S_5$+0.4% KOH) and to the reaction product of Example 8 (from 0.8% $P_2S_5$+0.8% KOH). The Example 12 reaction product (from 0.4% $P_2S_5$+0.8% KOH) shows an especially high overall rating and desirably low corrosion; and this data indicates that this ratio of $P_2S_5$ and KOH is particularly desirable.

By comparable procedures, using any known comparable phosphorus sulfide, or amount of phosphorus sulfide, or hydrocarbon lubricating oil stock, within the broad types and ranges as indicated hereinbefore, comparable improved lubricants are obtained.

If desired, the improved lubricants of the invention may be used in blends together with other lubricants or lubricant agents, e. g., with soap or the like in a grease. If desired, an agent for improving the clarity of the oil may be included, e. g., lecithin, lauryl alcohol, and the like. If desired, an agent for preventing foaming may be included, e. g., tetra-amyl silicate, an alkyl ortho-carbonate, ortho-formate or ortho-acetate, or a polyalkyl silicone oil.

In view of the foregoing disclosure, variations and modifications of the invention will be apparent to those skilled in the art, and it is intended to claim such variations and modifications broadly, except as do not come within the scope of the appended claims.

I claim:

1. A method of processing lubricating oil stock consisting essentially of hydrocarbon material to yield an oil having improved inhibition to oxidation in service, which method comprises treating said stock with sulfuric acid in a conventional manner, then treating the resulting acid-refined hydrocarbon with an amount of a phosphorus sulfide in the range of about 0.1 to about 0.75% by weight at a temperature in the range of about 275° to 450° F., then with an amount of a base in the range of about 0.25 to 6.0 equivalents per mol of the sulfide, and including at least one separate clay-treating step subsequent to the acid-refining step.

2. The method of claim 1 wherein the phosphorus sulfide is phosphorus pentasulfide, and the base is a metal base.

3. The method of claim 1 wherein the clay-treating step is just prior to the phosphorus sulfide treating step.

4. The method of claim 1 wherein an amount in the range of about 0.25 to about 0.6% of phosphorus sesquisulfide is used as the phosphorus sulfide and the treatment therewith is at a temperature of about 300° to 450° F.

5. The method of claim 4 wherein the clay-treating step is prior to the phosphorus sesquisulfide treating step, and an amount of potassium hydroxide in the range of about 0.1 to about 1.0% is used as the base.

6. The method of claim 4 wherein an amount of potassium hydroxide in the range of about 0.1 to about 1.0% is used as the base, and the clay-treating step follows the base-treating step.

7. The method of claim 3 wherein the phosphorus sulfide is phosphorus pentasulfide, and the base is a metal base.

8. The method of claim 7 wherein the clay-treating step is subsequent to the metal base treating step.

9. The method of claim 8 wherein an amount in the range of about 1.0 to 3.0 equivalents of potassium hydroxide is used as the base.

10. A lubricant obtained by the process of claim 1.

11. A lubricant obtained by the process of claim 2.

12. A lubricant obtained by the process of claim 3.

13. A lubricant obtained by the process of claim 4.

14. A lubricant obtained by the process of claim 5.

15. A lubricant obtained by the process of claim 6.

16. A lubricant obtained by the process of claim 7.

17. A lubricant obtained by the process of claim 8.

18. A lubricant obtained by the process of claim 9.

*19. A method of processing lubricating oil stock consisting essentially of hydrocarbon material to yield an oil having improved inhibition to oxidation in service, which method comprises treating said stock with sulfuric acid in a conventional manner, then treating the resulting acid-refined hydrocarbon with an amount of a phosphorus sulfide in the range of about 0.1 to about 0.75% by weight at a temperature in the range of about 275° F. to 450° F., then with potassium hydroxide in an amount of at least about 0.25 equivalent up to 8.0 equivalents per mol of the sulfide, and including at least one separate clay-*

*treating step subsequent to the acid-refining step.*

*20. A lubricant obtained by the process of claim 19.*

*21. The method of claim 19 wherein the stock is treated with an amount of phosphorus pentasulfide in the range of about 0.25 to 0.6% at a temperature of about 300° to 450° F. and then with an amount of dry potassium hydroxide in the range of about 0.6 to about 0.8% by weight of the stock.*

*22. A lubricant obtained by the process of claim 21.*

JOHN D. BARTLESON.

References Cited in the file of this patent or the original patent

UNITED STATES PATENTS

| Number | Name | Date |
|---|---|---|
| 1,087,888 | Petroff | Feb. 17, 1914 |
| 2,316,091 | White | Apr. 6, 1943 |
| 2,393,335 | Musselman | Jan. 22, 1946 |
| 2,398,429 | Hughes | Apr. 16, 1946 |
| 2,419,584 | Noland | Apr. 29, 1947 |

Certificate of Correction

Reissue No. 23,677 June 30, 1953

JOHN D. BARTLESON

It is hereby certified that error appears in the printed specification of the above numbered patent requiring correction as follows:

Column 3, line 8, for "alkali" read alkaline ;

and that the said Letters Patent should be read as corrected above, so that the same may conform to the record of the case in the Patent Office.

Signed and sealed this 8th day of September, A. D. 1953.

[SEAL]

ARTHUR W. CROCKER,
*Assistant Commissioner of Patents.*